United States Patent
Esmaeili

(10) Patent No.: US 9,470,907 B2
(45) Date of Patent: Oct. 18, 2016

(54) REVERSABLE ADJUSTABLE EYEGLASSES WITH POLARIZED AND/OR PRESCRIPTION LENSES

(71) Applicant: Seyed Ebrahim Seyed Saleh Esmaeili, Kuwait (KW)

(72) Inventor: Seyed Ebrahim Seyed Saleh Esmaeili, Kuwait (KW)

( * ) Notice: Subject to any disclaimer, the term of this patent is extended or adjusted under 35 U.S.C. 154(b) by 0 days.

(21) Appl. No.: 14/630,890

(22) Filed: Feb. 25, 2015

(65) Prior Publication Data

US 2015/0168741 A1 Jun. 18, 2015

Related U.S. Application Data

(60) Provisional application No. 61/976,603, filed on Apr. 8, 2014.

(51) Int. Cl.
*G02C 5/22* (2006.01)
*G02C 5/00* (2006.01)
*G02C 9/02* (2006.01)
*G02C 5/20* (2006.01)

(52) U.S. Cl.
CPC .............. *G02C 5/2263* (2013.01); *G02C 5/001* (2013.01); *G02C 5/20* (2013.01); *G02C 9/02* (2013.01); *G02C 2200/24* (2013.01)

(58) Field of Classification Search
CPC ........ G02C 5/001; G02C 5/006; G02C 5/08; G02C 5/20; G02C 5/22; G02C 5/2263; G02C 7/06; G02C 7/086; G02C 7/088; G02C 9/02; G02C 13/10; G02C 13/001; G02C 11/10; G02C 2200/18; G02C 2200/24; G02C 9/04
USPC ....... 351/54, 83, 84, 86, 115, 119, 121, 128, 351/133, 158
See application file for complete search history.

(56) References Cited

U.S. PATENT DOCUMENTS

| | | | | |
|---|---|---|---|---|
| 8,553,910 B1 * | 10/2013 | Dong | ..................... | G02B 27/02 351/158 |
| 2010/0053544 A1 * | 3/2010 | Beasley | .................. | G02C 7/06 351/54 |

* cited by examiner

*Primary Examiner* — Huy K Mai
(74) *Attorney, Agent, or Firm* — Richard C. Litman

(57) ABSTRACT

The present invention relates to a pair of glasses with polarized or prescription lenses that can be adjusted to provide two different looks. Rotatable side arms connected to the main frame through a leg seat and a rotating secondary frame provide a mechanism to interchange the interior and exterior sides of the glasses. A correct lens orientation indicator on the secondary frame ensures correct configuration. In addition, the proposed mechanism offers two folding styles, in the first one both side arms are folded next to each other at the same side of the main frame. In the second, the side arms are folded on opposite sides of each other. Furthermore, the present invention provides a simple mechanism to turn smart glasses on and off. If the camera placed on the side arm is facing outwards, the smart glasses turns on. When the camera faces inwards, the smart glasses turns off.

6 Claims, 13 Drawing Sheets

REVERSABLE ADJUSTABLE EYEGLASSES WITH POLARIZED AND/OR PRESCRIPTION LENSES

CROSS REFERENCE TO RELATED APPLICATIONS

TITLE: TWINIX GLASSES
INVENTOR: SEYED EBRAHIM ESMAEILI
APPLICATION NUMBER: U.S. 61/976,603
FILING DATE: Apr. 8, 2014

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to a pair of glasses with polarized and/or prescription lenses that can be adjusted to provide two different looks. Rotatable side arms connected to the main frame through a leg seat and a rotating secondary frame connected to the lenses provide a mechanism that allows interchanging the interior and exterior sides of the glasses frame. The correct lens orientation indicator placed on the secondary frame ensures that the right lens is facing the right eye and the left lens is facing the left eye. Furthermore, the present invention can be used to provide efficient and simple mechanism to turn smart glasses on and off. If the camera is placed on the surface of one of the side arms of the frame is facing outwards, the smart glasses turns on. When the user interchanges the interior sides of the frame with the exterior, and the camera faces inwards, the smart glasses turns off. In addition, the proposed mechanism offers two different folding styles. In the first one both side arms are folded next to each other and at the same side of the main frame. In the second, the side arms are folded on opposite sides of each other.

Several folding glasses have been proposed in the literature. For example, U.S. Pat. No. 7,621,633 B presents an invention that is intended to provide a modular eyeglass frame. The device may be used to selectively alter the appearance of the eyeglass frames for many different reasons and should not be limited in use to the applications mentioned herein. Since it is produced in an array of colors and styles, users enjoy interchanging several pairs of the present invention to correspond with particular outfits, occasions and moods. Being fully reversible, a pair of professional looking eyewear can be worn to the office or an important business meeting and with a simple manipulation of the ear pieces is flipped to reveal a fun design perfect for cocktails or an evening out with friends. Since it is simple to use, users appreciate the ease with which their frames are reversed. Of course, it is noted that the lenses are not polarized or prescribed for altering vision due to the reversal features of the present invention.

U.S. Pat. No. 4,787,731 discloses and invention that is a reversible eyeglass structure having an ear piece support assembly pivotally connected through a hinge connector assembly to an eyeglass frame assembly. The eyeglass frame assembly resembles a normal eyeglass assembly except that the glass sections and the main frame assembly are extended in parallel planes so that the eyeglass lens can be view through reversed directions and a nose bridge member can be used on a person's nose portion in opposite directions. The ear piece support assembly includes a pair of ear piece support members which are constructed in half sections with exterior surfaces of different colors and/or designs. The ear piece support members are pivoted 180 degrees to effectively present two sets of different appearing eyeglass wear in the one reversible eyeglass structure. The hinge connector assembly provides for ear piece and frame connector assemblies interconnected by a pin connector assembly and including biasing means to hold the ear piece support members in both usage conditions. In a second embodiment of a hinge connector assembly, a resilient pin connector assembly is pivoted so as to hold the ear piece support members against the eyeglass frame assembly under resilient pressure in a selected one of the two usage conditions.

U.S. Pat. No. 6,530,660 discloses a pair of eyeglasses 10 provided with a lens retaining portion 12 having a lens retaining members in which lenses are retained. The lens retaining member are joined by a bridge. Hinge is positioned behind the lens retaining portion. This permits the arm to swing in inward, so that arm extends over the back side of the lenses.

U.S. Pat. No. 5,384,604 presents a pair of collapsible glasses comprising two lens frames, a bridge pivotally connected between the two lens frames, two butterfly-shaped connecters respectively pivotally connecting a round front half temple with one of the two lens frame, two front half temples respectively pivotally connected with a rear half temple of a C shape made of elastic material. The two connecters able to be pivotally bent to let the front and the rear half temples stretched outward to fit the size of the face of a wearer, the two lens frames being foldable to the front of the bridge, the two front half temples being foldable to the side of the lens frames, and the rear half temples being foldable to the side of the front half temples.

U.S. Pat. No. 8,029,131 B discloses glasses comprising an invertible nose bridge and invertible temples. The glasses can be worn in two manners by rotating the glasses 180 degrees in the plane of the lens or lenses. The lenses are asymmetrical along an axis which is drawn through the nose bridge. The invention additionally discloses an invertible nose bridge characterized in that it comprises two recesses into which the nose fits.

U.S. Pat. No. 7,621,633 discloses a modular eyeglass frame that may include a lens frame and a plurality of handles with oppositely facing first and second sides. Each side may include unique surface indicia. A mechanism for interchangeably connecting the handles to the lens frame may further be included. A coupling may be attached to a proximal end of one of the handles. Helical spring members may be mated to the coupling at one end and may include a bearing at another end. Receiving blocks may be attached to the lateral ends of the lens frame and may feature sockets formed in an inner wall thereof, to receive each bearing. Grooves may be formed in lateral sides of the receiving blocks. Such grooves may be effectively axially aligned with locking arms such that the locking arms are inter fitted inside the grooves when the coupling is inter fitted between the receiving blocks. Of course, it is notable that the lenses are not polarized or prescribed for altering vision due to the reversal features of the present invention.

U.S. Pat. No. 6,783,236 discloses a pair of foldable glasses includes two lenses. Each lens has a first side and a second side, with the first side facing an eye when the glasses are worn, and the second side being opposite to the first side. In one approach, the lenses are connected together by a folding mechanism whereby the lenses can be folded with the first sides of both lenses facing each other. Each temple has a front section and a rear section that can be folded or retracted into the front section. This allows the temples to be in an extended or a shortened configuration. Each lens is connected or coupled to a temple by a pivoting joint, which allows the corresponding temple to be rotated from being perpendicular to being parallel to the lenses, and to be rotated from being extended rearward to being extended forward from the lenses.

U.S. Pat. No. 8,317,318 discloses a glasses with a side arm release system for a frame with changeable temple pieces.

U.S. Pat. No. 6,623,114 discloses a pair of glasses including a main frame having two side leg seats each respectively formed with a slide slot into which a slide maybe extended. The slide slot of the frame can drive the lens frame relative to the main frame, thereby compensating the deflection of the center of the lens when a user bows his head for reading or writing.

U.S. Pat. No. 6,091,546 discloses an eyeglass system which integrates interface within eyewear. The system includes a display assembly and one or more audio and video. The display assembly is mounted to one temple and provides an image which can be viewed by the user.

All of these patents provide some kind of foldable mechanism to the glasses. However, all of these inventions are restricted to non-polarized and non-prescription lenses. None of the above art, however, provides as does the proposed invention, a simple and cost effective solution capable of changing the looks of glasses with polarized and prescription lenses.

BRIEF SUMMARY OF THE INVENTION

Nowadays, prescription glasses as well as sunglasses are considered an accessory. People buy glasses in different shapes and colors to improve their looks and match their style. Today, glasses are available in a wide spectrum of sizes, colors, and shapes to satisfy the needs of users at all ages from teenagers, adults, to seniors.

Though, different foldable glasses with a variety of folding mechanisms are available, all of them are restricted to non-polarized and non-prescription lenses. The object of the present invention is to provide the user with a simple and cost effective solution to change the looks of eyeglasses with polarized or prescription lenses easily and elegantly. In addition, the proposed mechanism offers two different folded techniques. In the first one both side arms are folded next to each other and at the same side of the main frame. In the second, the side arms are folded on opposite sides of each other.

In accordance with the present invention, a mechanism that allows interchanging the interior sides of the glasses frame with the exterior and vice versa is introduced. Rotatable side arms and a rotatable secondary frame that is connected at both sides to the lenses enable two different and distinct looks for the glasses.

When the exterior and interior sides of the glasses frame differ in color and/or pattern, the two different looks enabled by the proposed invention will differ in color and/or pattern.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE INVENTION

Figure 1:
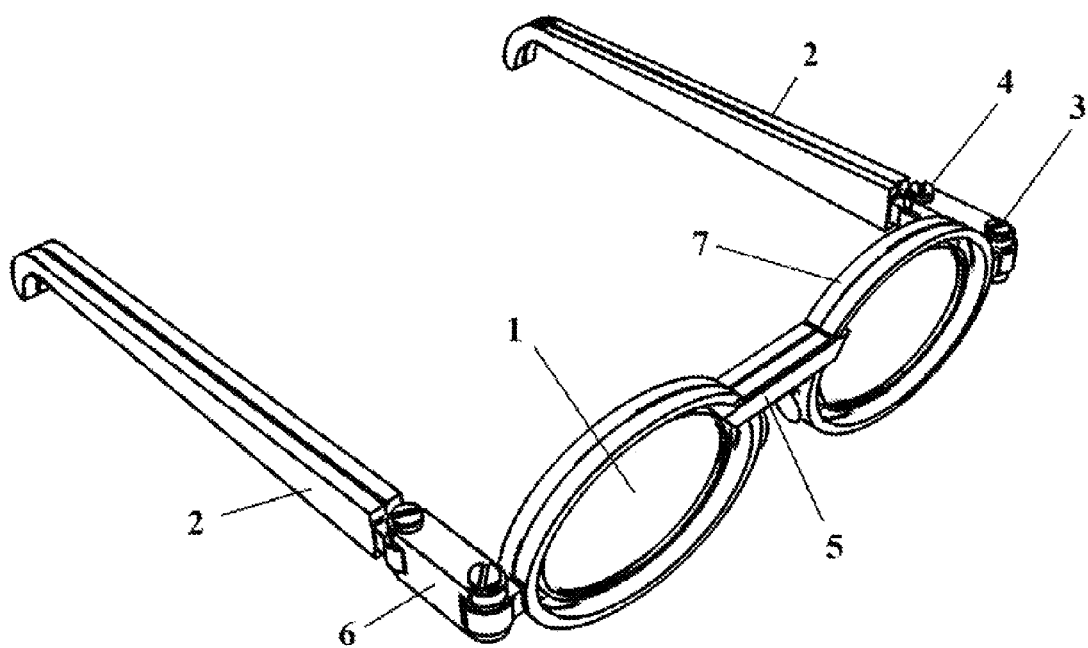
FIG. 1 is a perspective view of the proposed adjustable eye glasses.
Figure 2:
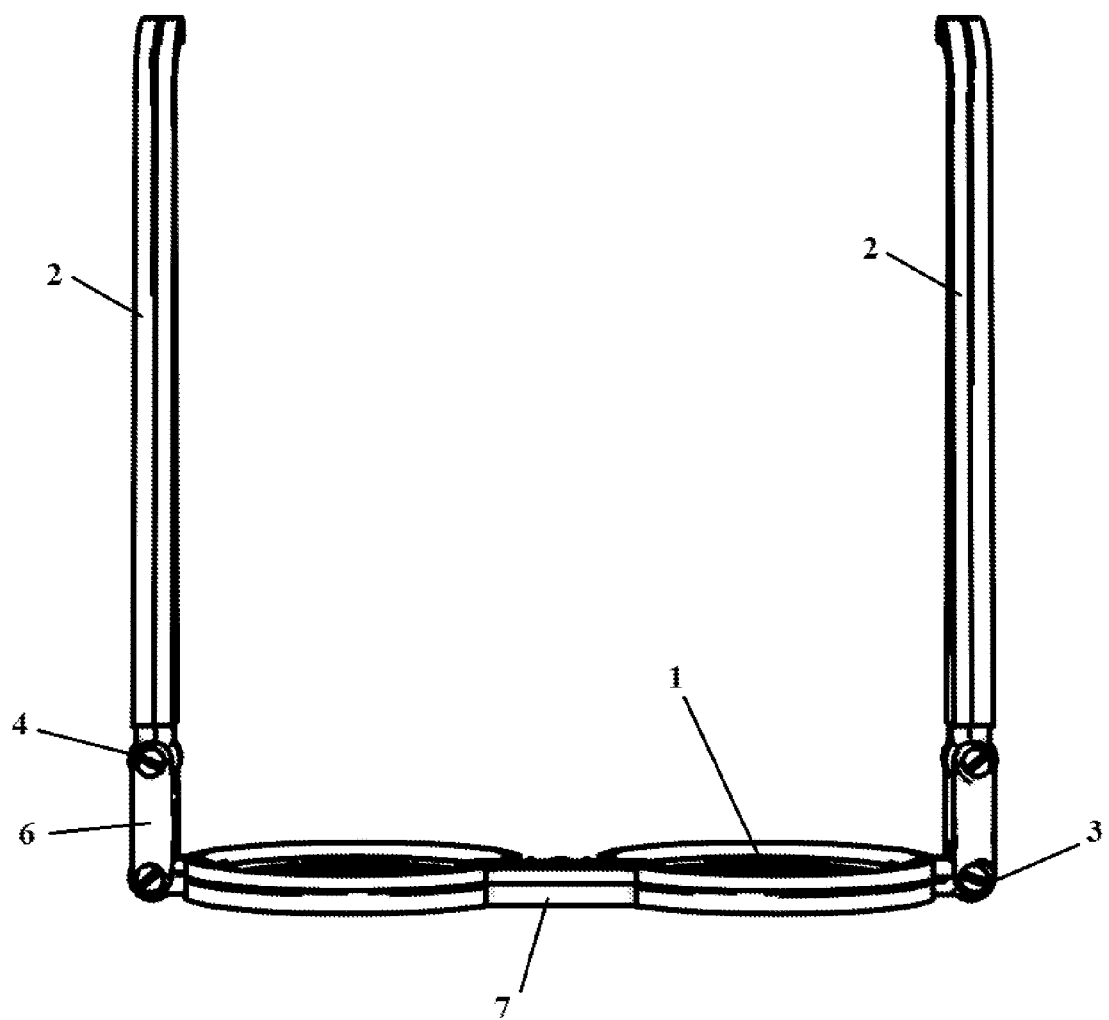
FIG. 2 is a top view of the proposed adjustable eye glasses invention.
Figure 3:
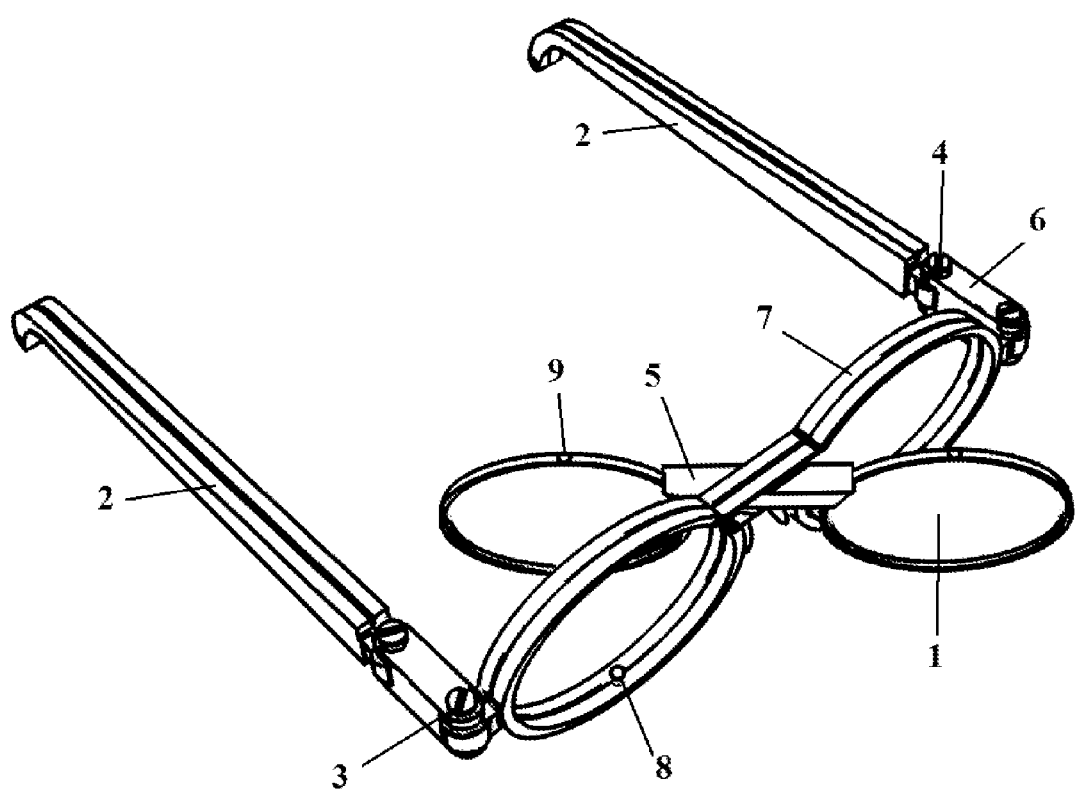
FIG. 3 is a perspective view of the proposed adjustable eye glasses showing how rotatory movement of the secondary frame around the center of the main frame.

Referring now to the invention in more details, in FIGS. 1, 2, and 3, there is shown a main frame 7, two rotatable side arms 2, and two lenses 1. Note that the lenses in the proposed invention can be polarized, prescription, as well as non-polarized and non-prescription lenses. The rotatable leg seats 6 are connected to the main frame 7 through the first screw 3 from one side and to the rotatable side arms by the second screw 4. A rotatable secondary frame 5 holds the two lenses 1. The rotatable secondary frame is connected at the center to the main frame 7.

FIG. 3 illustrates the rotational movement of the rotatable secondary frame 5 around the center of the main frame 7. A 180 degrees rotation of the secondary frame 5 is required whenever the user interchanges the interior sides of the glasses with the exterior to ensure that the left lens is facing the user's left eye and the right lens is facing the right eye. A correct lens orientation indicator 16 (FIGS. 9 and 10) alarms the user that the transformation is not complete and that the secondary rotatable frame needs to be rotated by 180 degrees. FIG. 3 also shows the spherical indentations 8 on the inner sides of the main frame 7. There are four indentations, two at the lower and upper left side and two at the upper and lower right side of the main frame 7. In addition to the four spherical indentations in the main frame, there are also similar indentations 9 on the outer side of the rotatable secondary frame 5, two at the lower and upper left side and two at the upper and lower right side of the rotatable secondary frame.

Figure 4:
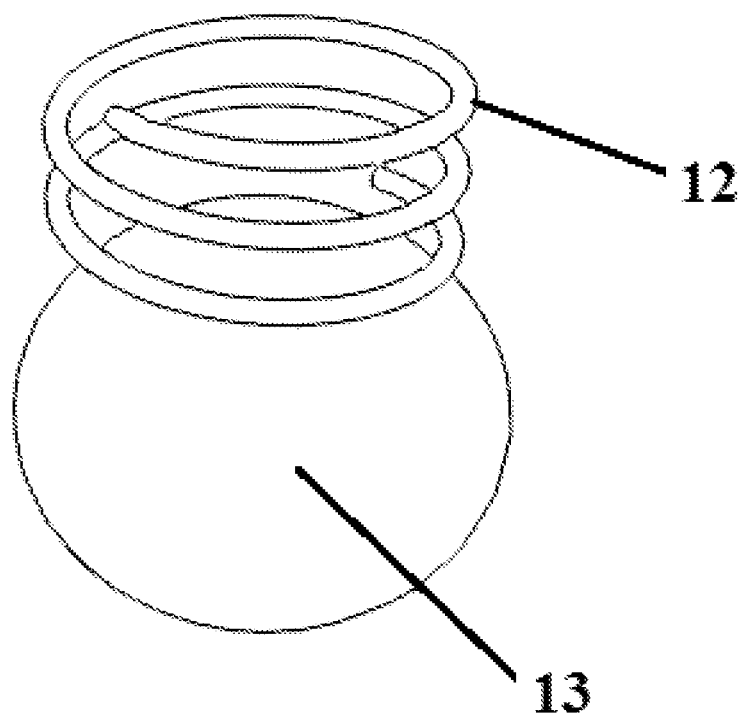
FIG. 4 is a perspective view of the rotatable secondary frame.

The four smaller spherical cavities 8 in the inner upper and lower sides of the main frame 7 at the left and right lens hold the four springs 12 and pressable balls 13 shown in FIG. 4. The spring 12 is fully enclosed in the cavity 8 and the pressable 13 ball is mounted on top of the spring 12. The top section of the pressable ball 13 that is not enclosed by the spherical cavity 8 is pushed outwards by the spring 12 into the spherical cavity 9 at the outer lower and upper sides of the rotatable secondary frame 5. The tip of the pressable ball 13 provides required friction to hold the rotatable secondary frame 5 in alignment with the main frame 7 and to prevent the secondary frame 5 from moving undesirably. Note that around two thirds of the pressable ball 13 is enclosed by the small spherical cavity 8. The opening of the cavity is smaller than the diameter of the pressable ball 13 in order to ensure that the ball 13 does not fall out when pushed outwards by the spring 12.

When the user wants to interchange between the interior and exterior sides of the glasses, the application of a small force will be sufficient to press the pressable balls 13 and the spring 12 downwards and move the rotatable secondary frame 5 so that the right/left lens will face the right/left eye.

Figure 5:
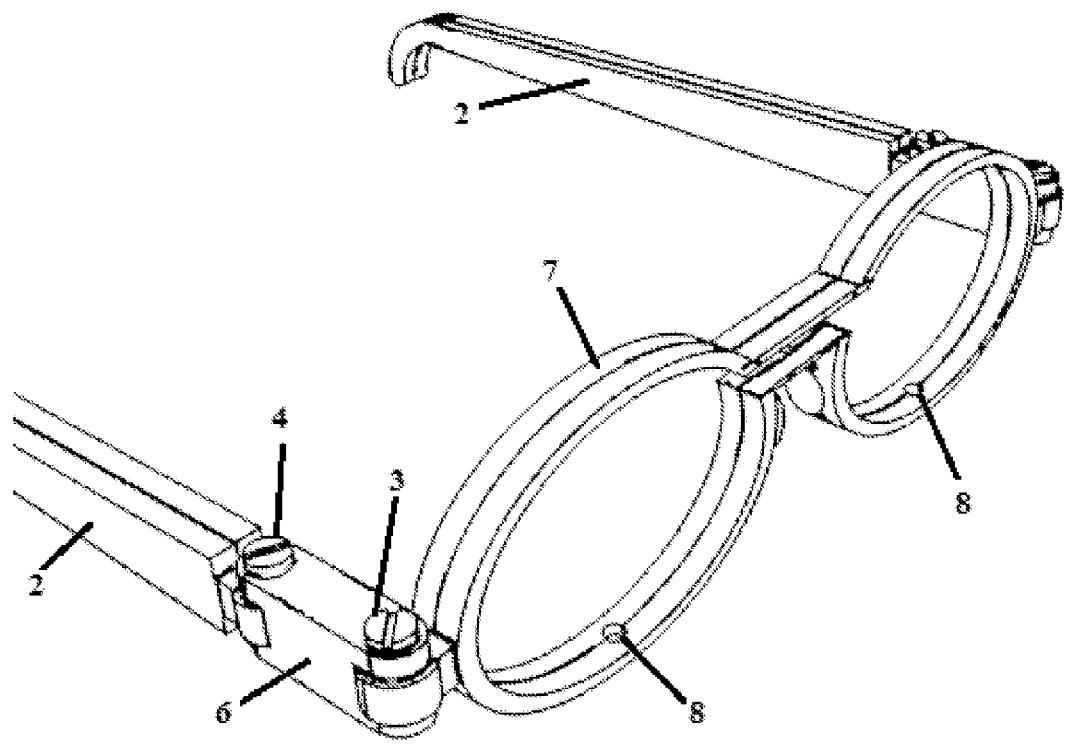
FIG. 5 is a perspective view of a close up to the rotatable secondary frame showing the central elevated cylinder with two side grooves.
Figure 6:
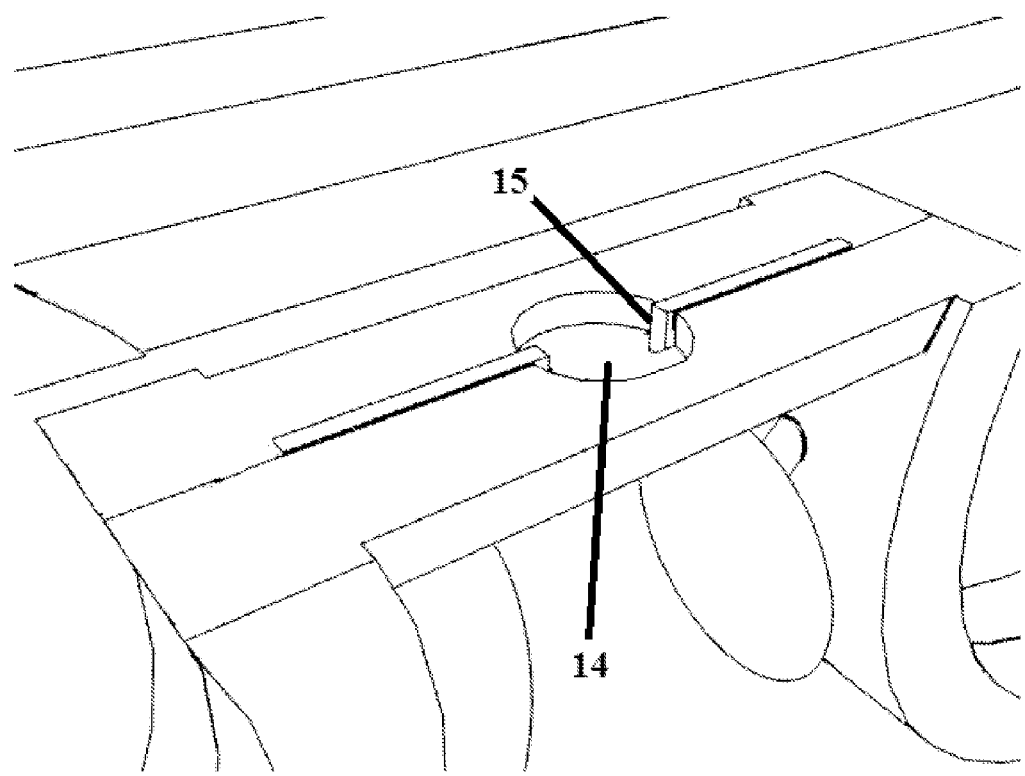
FIG. 6 is a perspective view illustrating the pressable ball with the spring.
Figure 7:
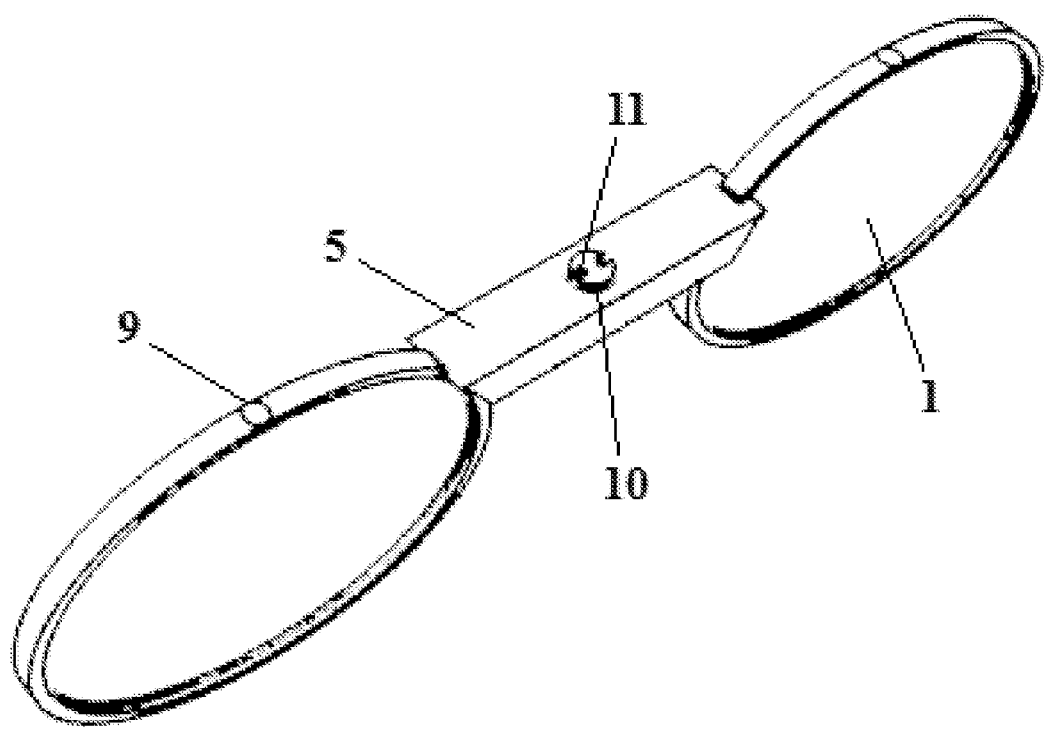
FIG. 7 is a perspective view of the main frame without the rotatable secondary frame.
Figure 8:
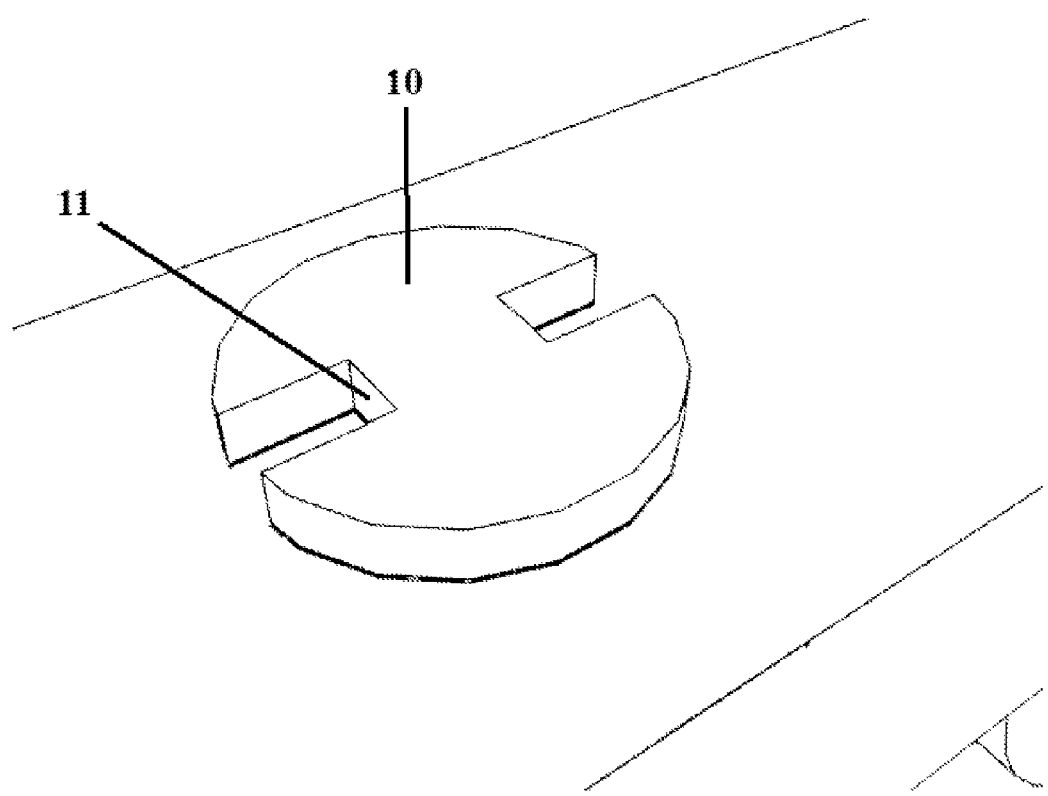
FIG. 8 is a perspective view of a close up of the main frame showing the central cylindrical cavity with the side bars or clickers.

A mechanism to allow the rotational movement of the rotatable secondary frame 5 around the center of the main frame 7 and at the same time prevent the undesirable movement of the secondary frame is illustrated in FIGS. 5, 6, 7, and 8. FIG. 5 shows a perspective view of the main frame 7 without the rotatable secondary frame 5. FIG. 6 shows a zoomed view of FIG. 5 at the center of the main frame 7. As illustrated in FIG. 6, the center of the main frame has a central cylindrical cavity 14. At the left and right sides of the cavity 14, there are two side bars or clickers 15. The tip of each side bar or clicker 15 rises above the inner circumference of the cylindrical cavity 14. FIG. 7 presents a perspective view of the rotatable secondary frame 5. It shows the elevated central cylinder 10 at the center of the secondary frame 5. There are two grooves 11 at the left and right sides of the central cylinder 10. FIG. 8 shows a zoomed view of FIG. 7 to further illustrated the elevated central cylinder 10 and the side grooves 11.

When connecting the rotatable secondary frame 5 to the main frame 7, the central cylindrical cavity 14 in the main frame 7 fully encloses the elevated central cylinder 10 in the secondary frame 5. The tip of each side bar or clicker 15 will enter the two grooves 11 at the left and right sides of the central cylinder 10. The side bars 15 can bend a little bit. This enables the user to rotate the rotatable secondary frame 5 when interchanging between the inner and outer side of the glasses. When the rotatable secondary frame 5 completes a 180 degrees, the tip of each of the bars or clickers 15 enters the side groove 11 and a clicking sound appears.

The pressable balls 13 and springs 12 can be used exclusively or with the central cavity 14 and clickers 15. Likewise the central cavity 14 and clickers 15 can be used exclusively or with the pressable balls 13 and springs 12.

Having a rotatable secondary frame 5 with a magnetized outer surface and a main frame 7 with an iron inner surface or vice versa is another feasible alternative. However, magnets might affect and interfere with electronic equipment and instruments.

Figure 9:
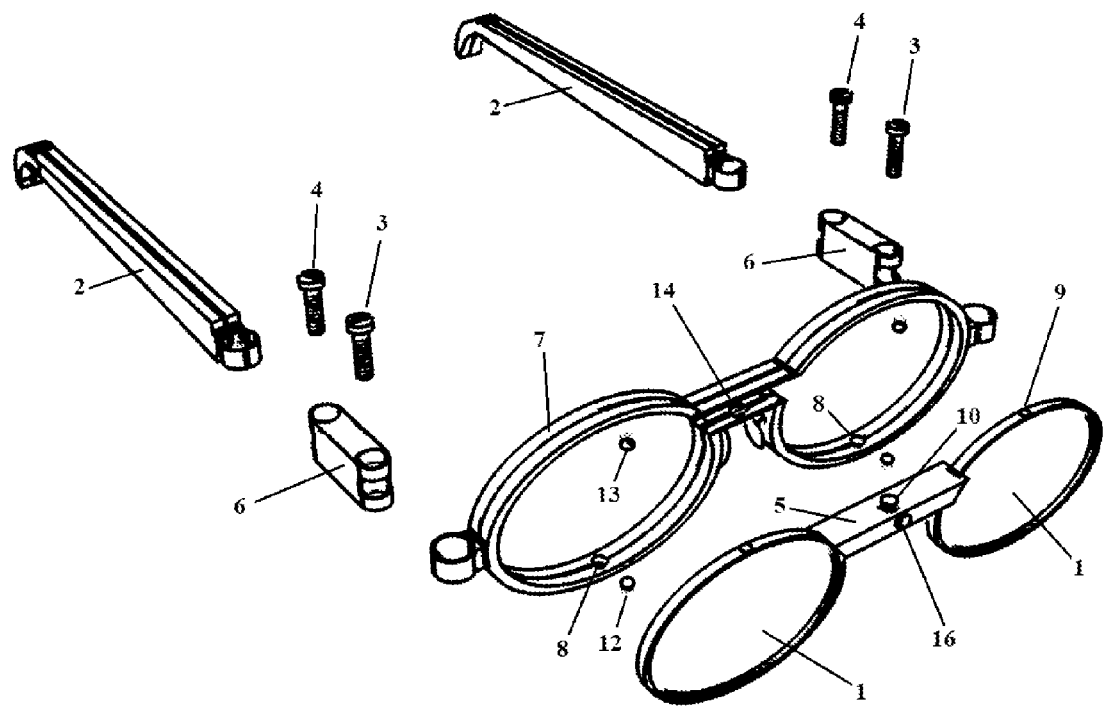
FIG. 9 is an exploded perspective view of proposed adjustable eye glasses showing different components.
Figure 10:
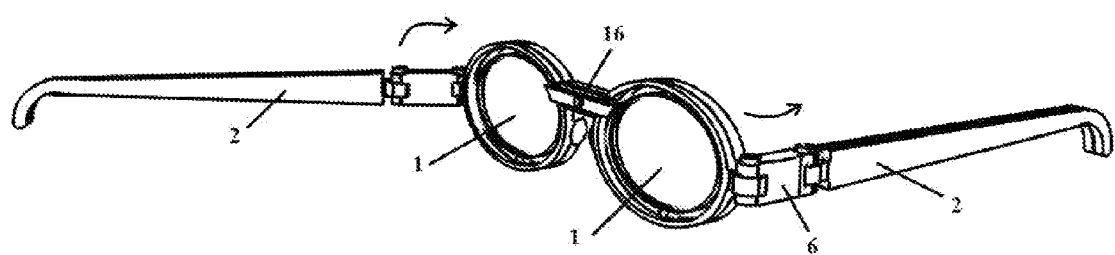
FIG. 10 shows a perspective view of a proposed adjustable eye glasses when the side arms are rotated 180 degrees to interchange the exterior side by the interior. Note that the correct lens orientation indicator 16, shows that the transformation is not complete. The left lens is facing the right eye and the right lens is facing the left eye. The user need to rotate the rotatable secondary frame by 180 degree to complete the transformation.
Figure 11:
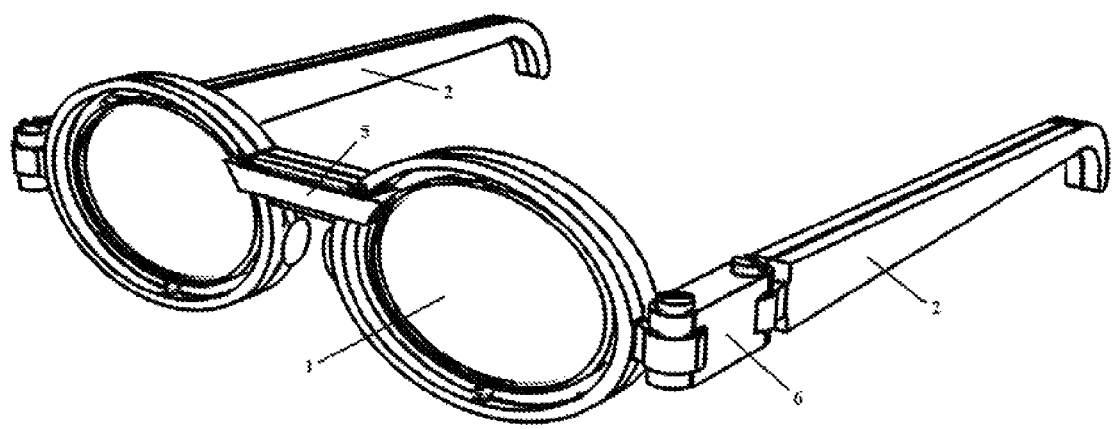
FIG. 11 illustrates the perspective view of the complete transformation of the proposed adjustable eye glasses.

FIG. 9 is an exploded perspective view of the proposed adjustable eye glasses showing different components. A correct lens orientation indicator 16 is illustrated in the figure. It is simply a red dot at the inner side of the rotatable secondary frame 5. When the correct lens orientation indicator 16 is facing outwards as illustrated in FIG. 10, it indicates that transformation between the inner and outer sides of the glasses is not complete. The left lens is facing the right eye and the right lens is facing the left eye. In order to complete the transformation, the user needs to rotate the rotatable secondary frame 5 by 180 degrees. After doing that, the correct lens orientation indicator 16 will be facing inwards thus ensuring that the right lens is facing the right eye and the left lens is facing the left eye as shown in FIG. 11. This feature enables the use of the proposed invention with polarized and prescription lenses.

Figure 12:
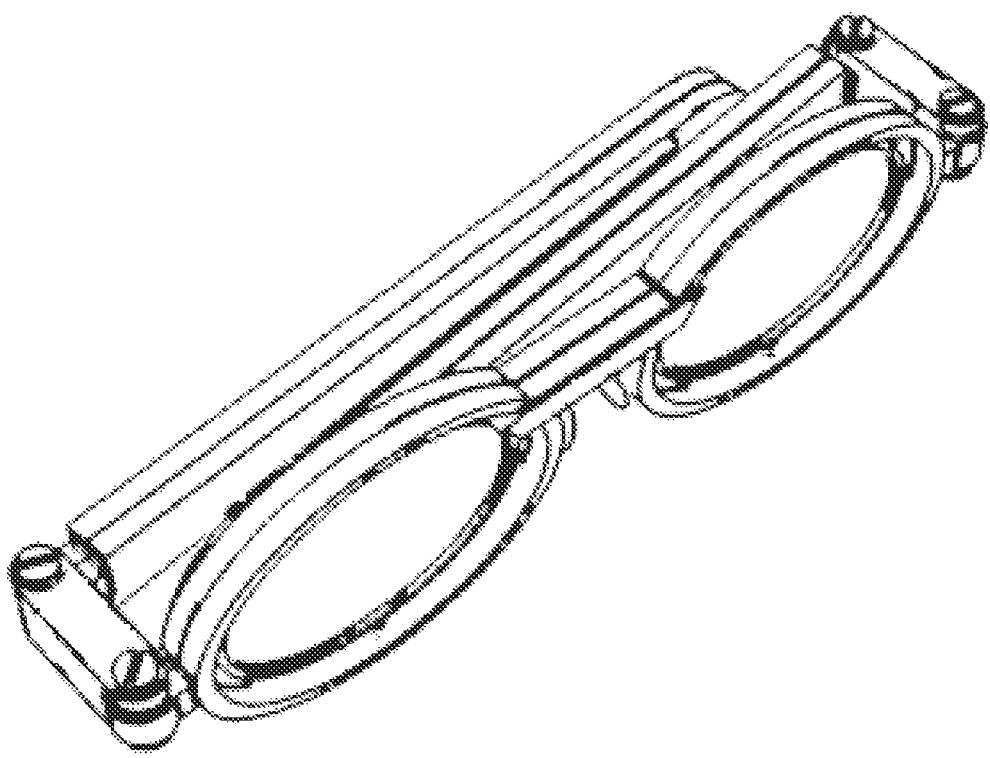
FIG. 12 shows how the proposed adjustable eye glasses can be folded. Here both side arms are folded next to each other.

The first folding style of the proposed adjustable eye glasses is shown in FIG. 12. FIG. 12 presents a perspective view the traditional folding style at which both side arms 2 are folded on the same side of the main frame 7.

Figure 13:
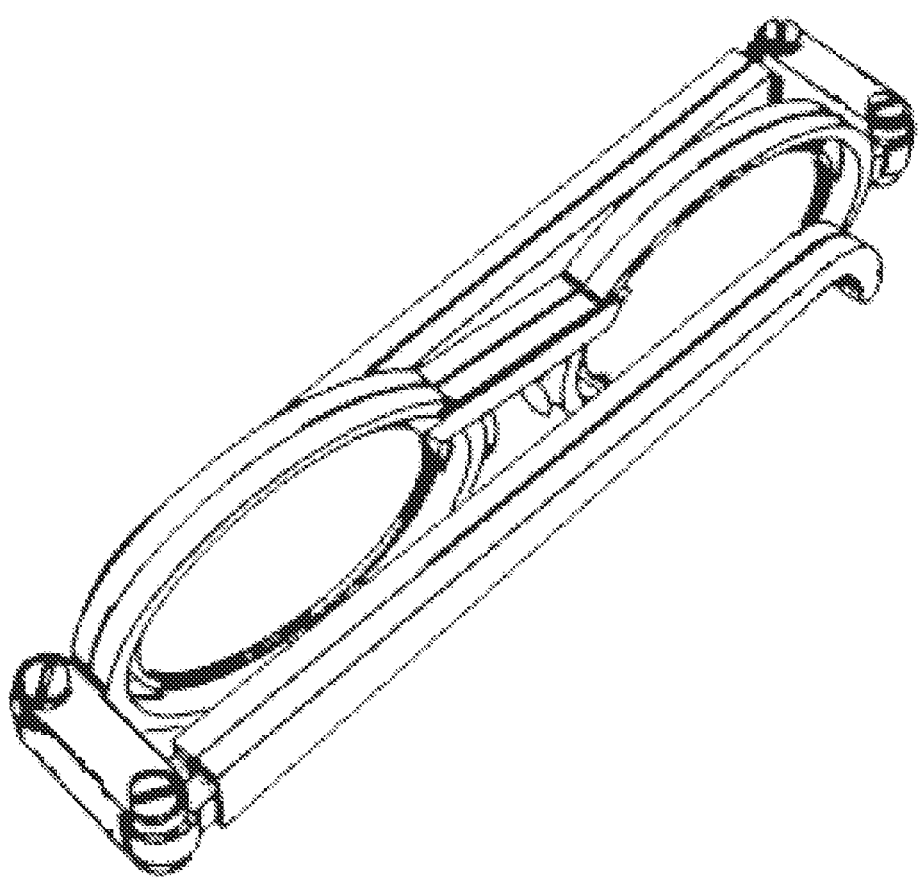
FIG. 13 is a perspective view of the second approach at proposed glasses can be folded. Here the side arms are folded on opposite sides of each other.

FIG. 13 illustrates the second folding style in which each side arm 2 is folded on the opposite side of the main frame 7.

What is claimed is:

1. A reversible eyeglass structure for presenting a plurality of outward appearances, comprising:
    a first frame assembly defining an eyeglass perimeter having first and second facing surfaces, first and second rings and a bridging connection therebetween, and first and second ends disposed opposite the bridging connection on the respective first and second ring;
    a second frame assembly having first and second loop portions for supporting left and right lenses, and having a bridge member connecting the first and second loop portions;
    wherein the first frame assembly circumscribes the second frame assembly;
    a pivot attachment connecting the bridging connection of the first frame assembly to the bridge member of the second frame assembly, the pivot attachment rotating the first and second loop portions between the first and second rings, selectively;
    a mechanism disposed between the first frame assembly and the second frame assembly for selectively retaining the second frame assembly circumscribed within the first frame assembly;
    an orientation indicator;
    a first leg seat attached to the first end of the first frame assembly;
    a second leg seat attached to the second end of the first frame assembly;
    a first side arm having first and second facing surfaces attached to the first leg seat; and
    a second side arm having first and second facing surfaces attached to the second leg seat;
    wherein the first leg seat and the first side arm form a first temple extending from the first end of the first frame assembly, and the second leg seat and the second side arm form a second temple extending from the second end of the first frame assembly;
    whereby the first temple being rotatable about the first end through an angle substantially about 180°, and second temple being rotatable about the second end through an angle substantially about t 80°.

2. The reversible eyeglass structure for presenting a plurality of outward appearances, according to claim 1, wherein the first surface of the first frame assembly, the first surface of the first side arm, and the first surface of the second side arm have a first common facade.

3. The reversible eyeglass structure for presenting a plurality of outward appearances, according to claim 2, wherein the second surface of the first frame assembly, the second surface of the first side arm, and the second surface of the second side arm have a second common facade.

4. The reversible eyeglass structure for presenting a plurality of outward appearances, according to claim 1, wherein the first leg seat being pivotally attached to the first end, and the second leg seat being pivotally attached to the second end.

5. The reversible eyeglass structure for presenting a plurality of outward appearances, according to claim 1, wherein the first leg seat being pivotally attached to the first side arm, and the second leg seat being pivotally attached to the second side arm.

6. The reversible eyeglass structure for presenting a plurality of outward appearances, according to claim 1, wherein the mechanism for selectively retaining the second frame assembly within the first frame assembly comprises a plurality of spring biased balls disposed about the first frame assembly in a plurality of predetermined positions, the biased balls are biased toward the second frame assembly, and a corresponding plurality of arcuate indentations disposed about the second frame assembly, each one of the arcuate indentations selectively receiving a respective one of the spring biased balls for holding the second frame assembly within the first frame assembly.

* * * * *